United States Patent
Hirooka et al.

(10) Patent No.: US 7,672,593 B2
(45) Date of Patent: Mar. 2, 2010

(54) OTDM TRANSMISSION METHOD AND APPARATUS

(75) Inventors: Toshihiko Hirooka, Sendai (JP); Masataka Nakazawa, Sendai (JP)

(73) Assignee: Japan Science and Technology Agency (JP)

( * ) Notice: Subject to any disclaimer, the term of this patent is extended or adjusted under 35 U.S.C. 154(b) by 812 days.

(21) Appl. No.: 10/562,163

(22) PCT Filed: Mar. 23, 2004

(86) PCT No.: PCT/JP2004/003957

§ 371 (c)(1),
(2), (4) Date: Sep. 26, 2006

(87) PCT Pub. No.: WO2005/002091

PCT Pub. Date: Jan. 6, 2005

(65) Prior Publication Data

US 2007/0109957 A1 May 17, 2007

(30) Foreign Application Priority Data

Jun. 26, 2003 (JP) .............................. 2003-181964

(51) Int. Cl.
*H04J 11/00* (2006.01)

(52) U.S. Cl. .............................. 398/98; 398/75; 398/80; 398/101

(58) Field of Classification Search ................... 398/52, 398/75, 136, 147, 158, 192, 208; 370/210, 370/321, 422, 294, 337, 375
See application file for complete search history.

(56) References Cited

U.S. PATENT DOCUMENTS 4,700,339 A * 10/1987 Gordon et al. ................ 398/80

(Continued)

FOREIGN PATENT DOCUMENTS

JP 08-265265 10/1996

(Continued)

OTHER PUBLICATIONS

Azana, Real-Time Fourier Transofmrations Performed Simultaneously Over Multiwavelength Signals, IEEE Photonics Technology Letters, Jan. 2001, vol. 13, No. 1.*

(Continued)

*Primary Examiner*—Ken N Vanderpuye
*Assistant Examiner*—Tanya Ngo
(74) *Attorney, Agent, or Firm*—Lowe Hauptman Ham & Berner, LLP

(57) ABSTRACT

An OTDM transmitting method and transmitter realizing an OTDM distortion-free transmission substantially not relying upon dispersion. A time division multiplexed OTDM signal from an OTDM signal transmitter (1) enters an optical Fourier transform unit (2). Optical Fourier transform can be carried out most accurately so long as the optical pulse is a chirp-free Fourier transform limit pulse. The optical Fourier transform unit (2) converts the time waveform of the pulse into a signal on the frequency axis, and an optical inverse Fourier transform unit (2') converts a spectral shape on the frequency axis into a time waveform (pulse). An optical fiber transmission line (3) is a transmission line having an arbitrary dispersion and a polarization mode dispersion. These dispersions may involve a time variation. An OTDM signal receiver (4) demultiplexes a transmission signal into low-speed optical signals, in a light region, receives optical pulses for respective channels and converts them into electric signals.

5 Claims, 12 Drawing Sheets

U.S. PATENT DOCUMENTS

| | | | | |
|---|---|---|---|---|
| 4,932,739 | A | * | 6/1990 | Islam .................. 359/108 |
| 5,852,700 | A | * | 12/1998 | Caponi et al. ............. 385/123 |
| 6,023,360 | A | * | 2/2000 | Morioka et al. ............... 398/1 |
| 6,204,944 | B1 | * | 3/2001 | Uchiyama et al. ........... 398/79 |
| 6,775,478 | B2 | * | 8/2004 | Suzuki et al. ............... 398/75 |
| 2006/0232847 | A1 | * | 10/2006 | Hirooka et al. ........... 359/237 |
| 2007/0025728 | A1 | * | 2/2007 | Nakazawa et al. ............ 398/1 |
| 2007/0109957 | A1 | * | 5/2007 | Hirooka et al. ........... 370/210 |
| 2007/0273958 | A1 | * | 11/2007 | Hirooka et al. ........... 359/327 |

FOREIGN PATENT DOCUMENTS

| | | |
|---|---|---|
| JP | 11-004196 | 1/1999 |
| JP | 11-112425 | 4/1999 |
| JP | 2001-111490 | 4/2001 |
| JP | 2002-250828 | 9/2002 |
| JP | 2003-051809 | 2/2003 |
| JP | 2004-266339 | 9/2004 |
| JP | 2004-317684 | 11/2004 |

OTHER PUBLICATIONS

Azana et al, Real-Time Fourier Transofmrations Performed Simultaneously Over Multiwavelength Signals, IEEE Photonics Technology Letters, Jan. 2001, vol. 13, No. 1.*

Sakano et al, Large-Dispersion-Tolerance Optical Signal Transmission System based on Temporal Imaging, Optics Letters, Apr. 15, 2002, vol. 2, No. 8.*

Mollenauer et al, Time-lens Timing-jitter compensator in ultra-long haul DWDM dispersion managed soliton transmissions, 2002, Optics Society of America.*

"Physics for Contemporary Human 5, Optics and Fourier Transform", Japan, Asakura Publishing, May 15, 1992, First Edition, pp. 89-92.

G.P. Agrawal, Takashi, Odagaki, Koichi Yamada, "Non-Linear Fiber Optics", Japan, Yoshioka Publishing/Makoto Yoshioka, May 25, 1997, Original Book, Second Edition, pp. 71-83.

Takashi Yamamoto et al.; "100 km Transmission of a 640 Gbit/s OTDM Signal using Femtosecond Pulses", vol. J83-B, No. 5, pp. 625-633, May 2000.

Takashi Yamamoto et al.; "1.28 Tbit/s—70km OTDM Femtosecond-Pulse Transmission Using Third and Fourth Order Simultaneous Dispersion Compensation with a Phase Modulator", vol. J84-B, No. 9, pp. 1587-1597, Sep. 2001.

Takashi Yamamoto et al; "100km Transmission of a 640 Gbit/s OTDM Signal using Femtosecond Pulses". B vol. J83-B No. 5 pp. 625-633 May 2000.

Takashi Yamamoto et al; "1.28 Tbit/s—70km OTDM Femtosecond-pulse Transmission using Third- and Fourth-order Simultaneous Dispersion Compensation with a Phase Modulator". B vol. J84-B No. 9 pp. 1587-1597 Sep. 2001.

J-L Augé et al; "Single channel 160 GB/s OTDM propagation over 480 km of standard fiber using a 40 GHz semiconductor mode-locked laser pulse source". 4/OFC2002 / Tuesday Morning.

"Large-dispersion-tolerance optical signal transmission system based on temporal imaging" Thoshikazu Sakano et al Apr. 15, 2002 vo. 27, No. 5 Optics Letters.

"Time-domain Fourier optics for polarization-mode dispersion compensation" M. Romagnoli et al Pierelli Cavi e Sistemi S.p.a. viale Sarca 222, 20126 Milan, Italy.

"Time-lense timing-jitter compensator in ultra-long haul DWDM dispersion managed soliton transmissions" Linn F. Mollenauer et al 2002 Optical Society of America.

Cleo 2002/Tuesday Morning pp. 164-165.

"Picosecond Time-Lenses" Asif A. Godil et al IEEE Journal of Quantum Electornics, vol. 30, No. 3, Mar. 1994.

"Temporal imaging with a time lens" Brian H. Kolner et al Optics Letters, vol. 14, No. 12, Jun. 15, 1989.

"Space-Time Duality and the Theory of Temporal Imaging" Brian H. Kolner 1994 IEEE.

Ammon Yariv (Author), Kunio Tada, Takeshi Kamiya (Translator), "Optical Electronics, Basic Edition", Apr. 25, 2002, pp. 119-122 and 240-242 with English Abstract.

* cited by examiner (a)

(b)

OTDM TRANSMISSION METHOD AND APPARATUS

TECHNICAL FIELD

The present invention relates to optical time division multiplexing (OTDM) transmission methods and apparatuses, and more specifically, to an OTDM transmission method and apparatus for making it possible to remove all (or almost all) of the distortions due to dispersion or polarization-mode dispersion of the optical fiber transmission line from the time-domain waveform of a signal, the distortions having the potential for presenting a problem when the transmission rate of OTDM transmission increases.

BACKGROUND ART

In optical-fiber communication, time division multiplexing (TDM) and wavelength division multiplexing (WDM) are used as multiplexing techniques for increasing the number of signal channels served by a single fiber-optic line and making effective use of the line. Especially, a method known as optical time division multiplexing (OTDM) enables optical transmission at a rate higher than any electric processing speed, by dividing an optical pulse into channels, modulating data at the base repetition frequency of the pulse train before multiplexing, and performing time-division multiplexing of each channel in the optical domain.

In 40-Gb/s or higher ultrahigh-speed OTDM transmission, for instance, the pulse interval is quite smaller than in conventional transmission systems. Accordingly, light to be used as a signal must be a very short pulse having a pulse width of several picoseconds to sub-picoseconds. When OTDM transmission is implemented with those very short pulses, one of important issues is to reduce signal waveform distortions due to linear effects of the optical fiber such as chromatic dispersion and polarization dispersion.

Experimental results of ultrahigh-speed OTDM transmission reported so far include 480-km transmission at 160 Gb/s, 100-km transmission at 640 Gb/s, and 70-km transmission at 1.28 Tb/s (see non-patent documents 1 to 3). In those experiments, time-domain waveform distortions of the transmission signal were reduced by using a dispersion compensating fiber or a dispersion slope compensating fiber and controlling the dispersion value and dispersion slope of the entire transmission fiber very precisely.

The present inventors have filed patent applications on an optical transmission method and apparatus which compensate for arbitrary dispersion, polarization-mode dispersion, and waveform distortions of the signal transmitted through an optical fiber having timing jitter, simultaneously and completely by a Fourier transform (patent document 1), and on an optical pulse compressor and optical pulse generator which compress the time width of an optical pulse output from a pulse light source at a certain ratio and provide a certain pulse waveform, with very short pulse techniques used in ultrahigh-speed optical transmission and optical measurement (patent document 2).

Non-Patent Document 1

J. L. Auge, M. Cavallari, M. Jones, P. Kean, D. Watley, and A. Hadjifotiou, "Single channel 160 Gb/s OTDM propagation over 480 km of standard fiber using a 40 GHz semiconductor mode-locked laser pulse source," Optical Fiber Communication Conference (OFC) 2002, Paper TuA3.

Non-Patent Document 2

Takashi Yamamoto, Eiji Yoshida, Koichi Tamura, Masataka Nakazawa, "640-Gb/s OTDM signal transmission over 100 km, using femtosecond pulses," the Transactions (C), the Institute of Electronics, Information and Communication Engineers of Japan, Vol. J83-B, pp. 625-633, 2000.

Non-Patent Document 3

Takashi Yamamoto, Koichi Tamura, Masataka Nakazawa, "1.28-Tb/s OTDM transmission of femtosecond pulses over 70 km, using simultaneous compensation of third-order or fourth-order dispersion by a phase modulator," the Transactions (B), the Institute of Electronics, Information and Communication Engineers of Japan, Vol. J84-B, pp. 1587-1597, 2001

Patent Document 1

Japanese Patent Application No. 2003-23973

Patent Document 2

Japanese Patent Application No. 2003-109708

DISCLOSURE OF INVENTION

Because the ultrahigh-speed OTDM transmission uses very short pulses, the transmission system has a small tolerance to dispersion of the transmission fiber fundamentally. A small change in dispersion value has a great effect on the pulse transmission characteristics. In the transmission of very short pulses, consideration must be given to the effect of broadening of a pulse (polarization mode dispersion) caused by random changes in the polarization state of the transmission signal, induced by disturbances such as vibration and temperature variations. Accordingly, an adaptive equalization technique for dispersion and a polarization-mode dispersion compensation technique are required to ensure a sufficient tolerance to changes in the dispersion value and polarization mode dispersion. These dispersion compensation techniques have not yet been put into active use.

The present invention addresses the problem by applying the following properties actively to the OTDM signal transmission technique: a spectral profile is maintained completely even when the time-domain waveform is distorted because of the linear effect of the optical fiber; and an optical Fourier transform allows an OTDM signal and a WDM signal to be converted mutually at once. N bits of the OTDM signal are converted together to N spectrum sequences of the WDM signal by performing an optical Fourier transform on the transmitter side of the optical fiber transmission line, and the spectral profile of the transmission signal is converted to a time-domain waveform by performing an optical inverse Fourier transform on the receiver side. With these conversions, the original signal waveform can be completely regenerated without linear distortions.

Accordingly, an object of the present invention is to provide an OTDM transmission method and apparatus that implement distortion-free OTDM transmission substantially independent of dispersion.

A first solution of the present invention provides an OTDM transmission method for implementing distortion-free transmission, wherein an optical time-division multiplexed (OTDM) signal pulse train is converted to a spectrum sequence of wavelength division multiplexed (WDM) signal by means of an optical Fourier transform circuit for converting an optical pulse waveform in the time domain to the frequency spectral profile or envelope of the pulse; the converted optical pulse train is transmitted in an optical fiber; the WDM signal spectral sequence after transmission in the optical fiber is converted to an OTDM signal pulse train by means of an optical inverse Fourier transform circuit for receiving an optical pulse train transmitted in the optical fiber and converting the frequency spectral profile or envelope to the optical pulse waveform of the pulse in the time domain, to regenerate the time-domain waveform of the OTDM signal pulse train before transmission; and the frequency spectral profile is maintained even if the transmitted optical pulse receives any linear time distortion in the optical fiber.

A second solution of the present invention provides an OTDM transmission apparatus including an optical time-division multiplexing (OTDM) signal transmitter for multiplexing a transmission optical pulse; an optical Fourier transform circuit for converting the optical pulse waveform in the time domain of an OTDM signal pulse train output from the OTDM signal transmitter to the frequency spectral profile of the pulse; an optical inverse Fourier transform circuit for converting the frequency spectral profile of the optical pulse of the optical pulse train transmitted in an optical fiber transmission line to an optical pulse waveform in the time domain; and an OTDM signal receiver for demultiplexing the optical pulse train output from the optical inverse Fourier transform circuit into low-speed optical signals and receiving at each channel; and the optical Fourier transform circuit is used to convert the OTDM signal pulse train to the sequence of wavelength division multiplexed (WDM) signal spectrums; the converted optical pulse train is transmitted in the optical fiber; the time-domain waveform of the OTDM signal pulse train before transmission is regenerated by converting the WDM signal spectrum sequence after it is incident on the optical fiber transmission line and transmitted in the optical fiber transmission line to an OTDM signal pulse train by means of the optical inverse Fourier transform circuit; and distortion-free transmission is implemented because the frequency spectral profile is maintained even if the transmitted optical pulse is subjected to any linear time distortion in the optical fiber transmission line.

BEST MODE FOR CARRYING OUT THE INVENTION

Embodiments of the present invention will be described with reference to the drawings.

1. OTDM Transmission System

Figure 1:
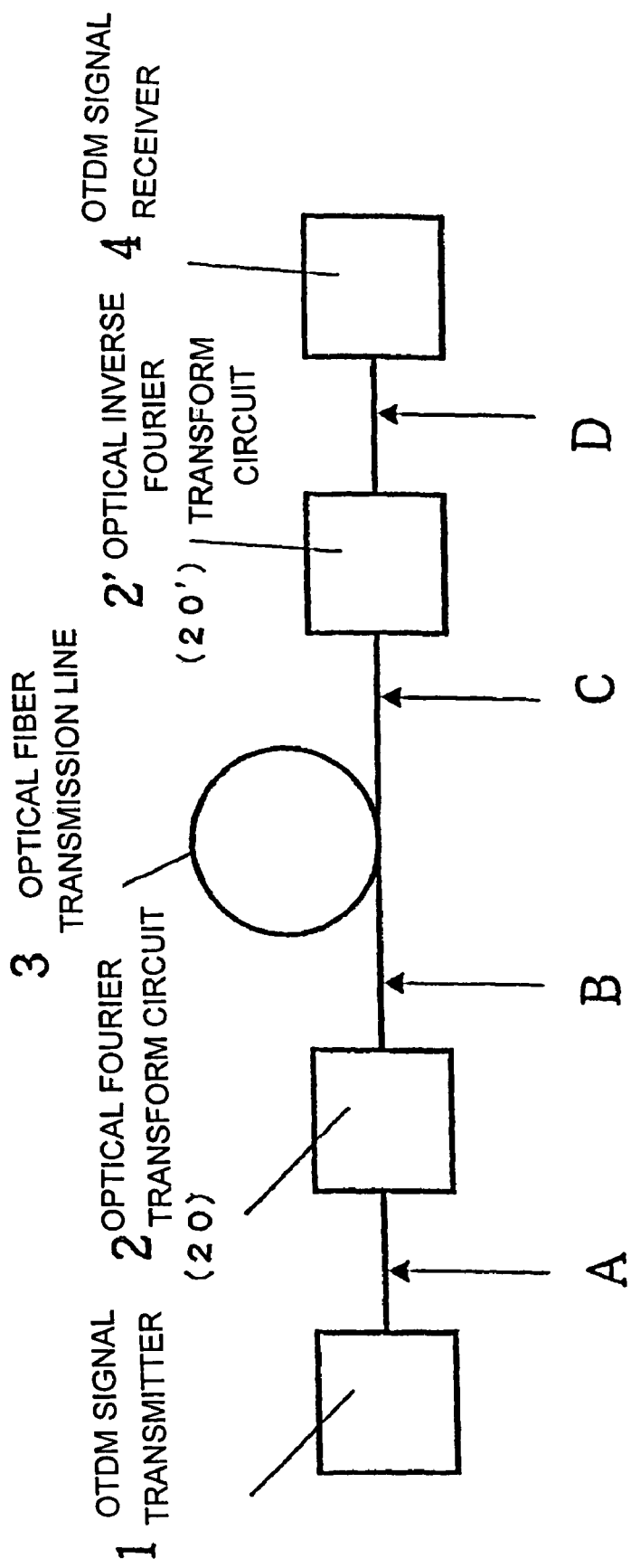
FIG. 1 is a diagram showing an OTDM transmission system of a first embodiment.

FIG. 1 is a diagram showing the configuration of an OTDM transmission system of an embodiment. The OTDM transmission system includes an OTDM signal transmitter 1, an optical Fourier transform circuit 2 (20), an optical inverse Fourier transform circuit 2' (20'), an optical fiber transmission line 3, and an OTDM signal receiver 4.

An OTDM signal sent from the OTDM signal transmitter 1 is incident on the optical Fourier transform circuit 2. If the optical pulse is a Fourier transform-limited pulse without chirp, an optical Fourier transform, which will be described later, can be executed most accurately. The Fourier transform-limited pulse is also referred to as a transform-limited pulse, and the pulse has an exact spectral width for the time-domain waveform. That type of Gaussian pulse satisfies this condition: The product of the time-domain pulse width $\Delta\tau$ and the spectral width $\Delta\nu$ is nearly equal to 0.441 ($\Delta\tau\Delta\nu\approx0.441$). The optical Fourier transform circuit 2 converts the time-domain waveform of the pulse to a signal in the frequency domain while the optical inverse Fourier transform circuit 2' converts the spectral profile in the frequency domain to a time-domain waveform (pulse). The optical fiber transmission line 3 is a transmission line having arbitrary dispersion and polarization-mode dispersion. The amount of dispersion may vary with time. The OTDM signal receiver 4 demultiplexes the transmission signal into low-speed optical signals in the optical region, receives an optical pulse of each channel, and converts the pulse to an electric signal. The OTDM signal receiver 4 may use a clock signal extracted from the transmission signal by the optical inverse Fourier transform circuit 2' (20') for demultiplexing. Alternatively, an independent clock signal source or a different means can be used.

The optical Fourier transform circuit and the optical inverse Fourier transform circuit of first and second embodiments will be described. The two circuits of the first or second embodiment may be used, or one circuit of the first embodiment and the other circuit of the second embodiment may be used.

2. OTDM Transmission Apparatus of a First Embodiment

Figure 2:
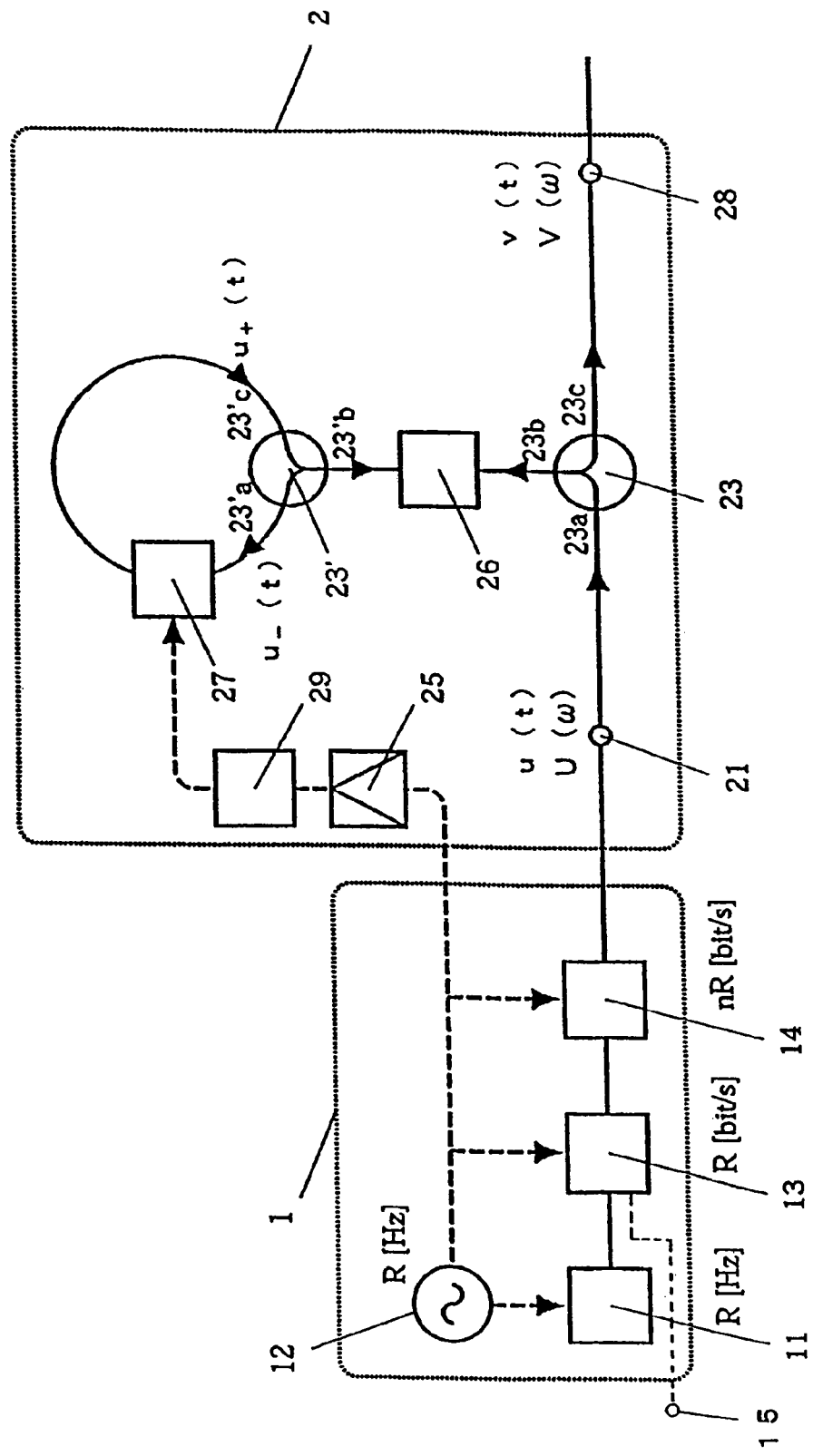
FIG. 2 is a diagram showing an example configuration of an OTDM signal transmitter 1 and an optical Fourier transform circuit 2 shown in FIG. 1.

FIG. 2 shows the configuration of the OTDM signal transmitter 1 and the optical Fourier transform circuit 2 of a first embodiment.

As shown in FIG. 2, the OTDM signal transmitter 1 includes an optical pulse light source 11, a clock signal source 12, an optical modulator 13, an OTDM multiplexer 14, and a data input terminal 15. The optical pulse light source 11 operates at a frequency of R (Hz) supplied from the clock signal source 12. The optical modulator 13 is driven by the clock signal supplied from the clock signal source 12 and modulates an optical pulse train having a base repetition frequency of R (Hz) to an optical pulse signal sequence of a transmission rate of R (b/s) in accordance with transmission data input from the data input terminal 15. The OTDM multiplexer 14 is driven by the clock signal supplied from the clock signal source 12, and time-division-multiplexes the optical pulse signal sequences of n channels at a base repetition frequency of R to make the transmission rate n times higher, and outputs the pulse at the repetition frequency of the OTDM signal pulse train (transmission rate of nR b/s). In the figure, a solid line represents the route of the optical pulse while a broken line represents the route of the electric signal.

The optical Fourier transform circuit 2 shown in FIG. 2 includes an input terminal 21, optical circulators 23 and 23', an electric amplifier 25, a dispersion element 26, a phase modulator 27, an output terminal 28, and a multiplier or divider 29.

The phase modulator 27 is preferably a phase modulator utilizing the electrooptic effect such as $LiNbO_3$, for instance. The phase modulator 27 may also use the phase modulation effect of EA (electro-absorption) or SOA (semiconductor optical amplifier). Generally, many phase modulators have polarization dependency, but the phase modulator 27 may be a polarization-independent optical device or may eliminate the polarization dependency by a polarization diversity method.

A phase shifter and a optical delay fiber may be provided to apply phase modulation to the optical pulse at an optimum timing. If the timing of modulation varies with temperature or another factor, the phase shifter can automatically adjust the phase shift amount to apply optimum modulation. An electric amplifier may also be provided to output a drive signal for driving the phase modulator 27 in accordance with the output of the phase shifter.

The dispersive medium 26 can be a fiber Bragg grating, a pair of diffraction gratings, or a single-mode optical fiber having such group velocity dispersion characteristics that a zero-dispersion region exists near the 1.3-μm wavelength region.

The input terminal 21 is coupled to a port 23a of the optical circulator 23. The port 23a of the optical circulator 23 is coupled via a port 23b, the dispersion element 26, and a port 23'b of the optical circulator 23' to a port 23'a. The ports 23'a and 23'c of the optical circulator 23' are connected in a loop passing through the phase modulator 27. The port 23b of the optical circulator 23 is coupled through a port 23c to the output terminal 28. The phase modulator 27 applies phase modulation synchronized with the OTDM signal pulse train to a pulse by using the clock signal supplied from the clock signal source 12 in the OTDM signal transmitter 1 as a driving frequency. The clock signal source 12 is coupled through the electric amplifier 25 to the driver of the phase modulator 27 (see patent documents 1 and 2). The driving frequency of the phase modulator 27 of the present embodiment is generally set to 1/N times the repetition frequency of the OTDM signal pulse train (N is an integer), which will be described later. The value of N may be equal to a time division number n (N=n). This can be implemented by inserting an appropriate multiplier or divider 29 between the electric amplifier 25 and the phase modulator 27 or by removing the multiplier or divider.

Figure 4:
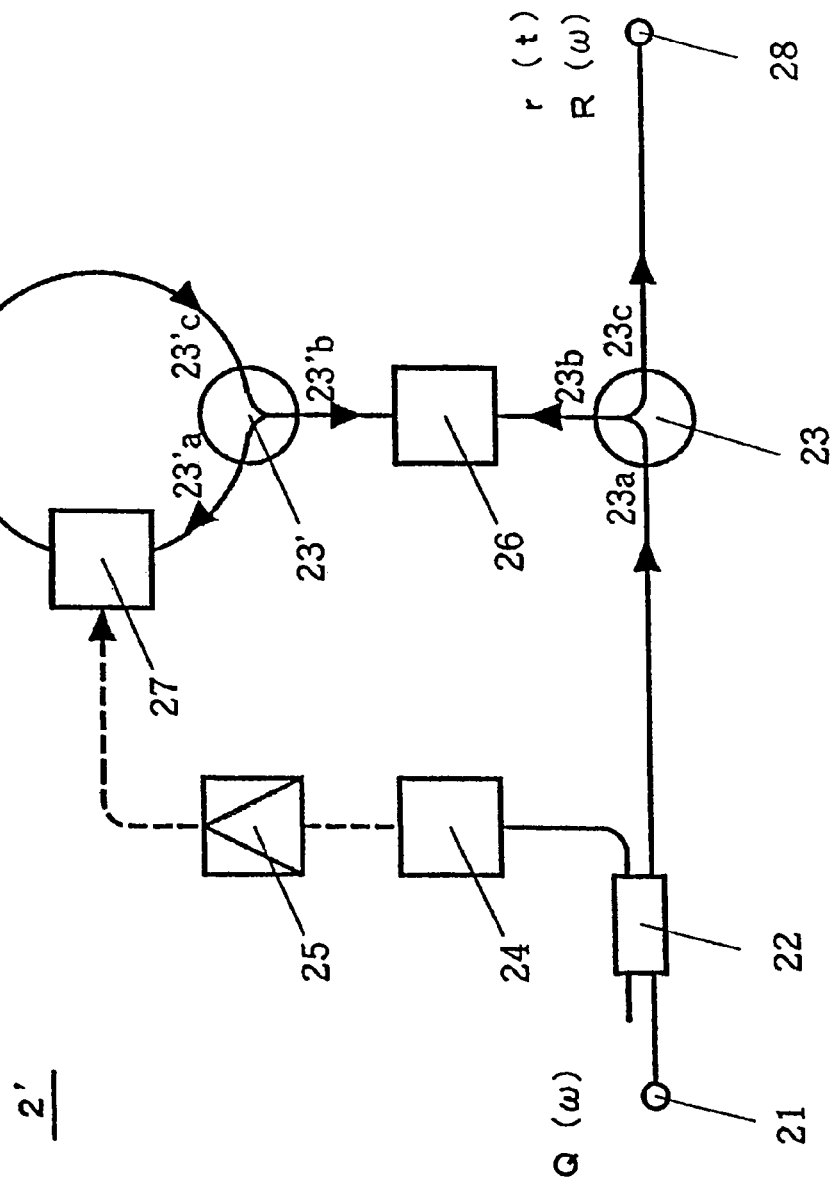
FIG. 4 is a diagram showing the configuration of an optical inverse Fourier transform circuit 2' of the first embodiment shown in FIG. 1.

FIG. 4 is a diagram showing the configuration of the optical inverse Fourier transform circuit 2' for carrying out an optical inverse Fourier transform in the first embodiment. As shown in the figure, the optical inverse Fourier transform circuit 2' includes an input terminal 21, an optical coupler 22, optical circulators 23 and 23', a clock-signal regeneration circuit 24, an electric amplifier 25, a dispersion element 26, a phase modulator 27, an output terminal 28, and a multiplier or divider 29. The element having the same reference numeral as in FIG. 2 has the same configuration and function. The optical inverse Fourier transform circuit 2' differs from the optical Fourier transform circuit 2 shown in FIG. 2 in that the input terminal 21 is coupled to the optical coupler 22 with one output coupled to the port 23a of the optical circulator 23 and the other output coupled through the clock-signal regeneration circuit 24 and the electric amplifier 25 to the driver of the phase modulator 27. In the figure, solid lines represent the routes of the optical pulses while a broken line represents the route of the electric signal.

In contrast to the optical Fourier transform used on the transmitter side, the optical inverse Fourier transform can be carried out by choosing a dispersion amount so that the sign of a dispersion element D' of the optical inverse Fourier transform circuit 2' becomes opposite to the sign of the dispersion element D used by the optical Fourier transform circuit 2 (D'=−D). At the same time, the chirp K' of the phase modulator in the optical inverse Fourier transform circuit 2' is chosen so that the sign becomes opposite to the sign of the chirp K of the phase modulator used by the optical Fourier transform circuit 2 (that is, K'=−K). The chirp of the phase modulator can reverse in sign by inverting the phase of the voltage applied to the phase modulator.

A clock signal must be extracted from the signal pulse train by the optical coupler 22, the clock-signal regeneration circuit 24, and the electric amplifier 25, and the phase modulator 27 must be driven by the obtained clock frequency, so that the phase modulator 27 of the optical inverse Fourier transform circuit 2' can apply phase modulation synchronized with the signal pulse train to the pulse. The original OTDM signal pulse train is converted to a WDM signal on the transmitter side, and a clock signal cannot be extracted directly from the WDM signal. However, because the channel interval Δω of the WDM signal and the bit interval Δt of the original OTDM signal have a relationship expressed as Δω=KΔt, the clock signal can be regenerated from Δω.

Figure 5:
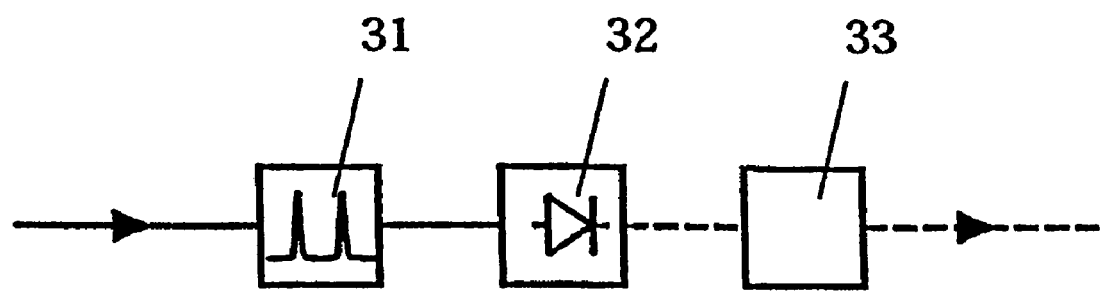
FIG. 5 is a diagram showing the configuration of a clock-signal regeneration circuit shown in FIG. 4.

FIG. 5 is a diagram showing the configuration of the clock-signal regeneration circuit 24. In the figure, a solid line represents the route of the optical pulse while a broken line represents the route of the electric signal. The clock-signal regeneration circuit 24 includes a wavelength filter 31, a photodetector 32, and a divider 33. Two adjacent frequency channels are separated by the wavelength filter 31, and a beat signal corresponding to the difference Δω between the two frequency channels is incident on the photodetector 32 and converted to an electric signal. By passing the signal through the 1/K divider 23, the clock signal corresponding to the bit interval Δt is regenerated.

The general operation of the OTDM transmission system will next be described with reference to FIGS. 1, 2, and 4.

The operation of the optical Fourier transform circuit 2 will be described first.

The OTDM signal generated by the OTDM signal transmitter 1 is denoted by u(t), and the frequency spectrum is denoted by U(ω). The relationship between the time signal u(t) and its frequency spectrum U(ω) can be expressed as follows:

$$U(\omega) = \int_{-\infty}^{\infty} u(t)\exp(i\omega t)dt \tag{1}$$

The OTDM signal is incident on the input terminal 21 of the optical Fourier transform circuit 2 shown in FIG. 2. After the signal passes the ports 23a and 23b of the optical circulator 23 and the dispersion element 26, the time-domain waveform u_(t) of the signal is expressed as follows:

$$u_-(t) = \frac{1}{\sqrt{2\pi i D}} \int_{-\infty}^{\infty} u(t') \exp\left(-\frac{i}{2D}(t-t')^2\right) dt' \quad (2)$$

where D is the dispersion amount of the dispersion element 26. If the dispersion element 26 is configured by an optical fiber with a second-order dispersion of k" and a length of L, the dispersion amount D is equal to k"L (D=k"L). Through the use of this relationship, a temporal change in phase (chirp) generated by a subsequent optical Fourier transform is compensated for in advance.

After the signal passes the ports 23'b and 23'a of the optical circulator 23' and the phase modulator 27, the time-domain waveform u₊(t) of the signal is expressed as follows:

$$u_+(t) = u_-(t) \exp(iKt^2/2) \quad (3)$$
$$= \frac{\exp(iKt^2/2)}{\sqrt{2\pi i D}} \int_{-\infty}^{\infty} u(t') \exp\left(-\frac{i}{2D}(t-t')^2\right) dt'$$

where K is the chirp rate of the phase modulator 27. After the signal passes the ports 23'c and 23'b of the optical circulator 23', the dispersion element 26 again, and the ports 23b and 23c of the optical circulator 23, the time-domain waveform v(t) of the signal obtained at the output terminal 28 is expressed as follows:

$$v(t) = \frac{1}{\sqrt{2\pi i D}} \int_{-\infty}^{\infty} u_+(t') \exp\left(-\frac{i}{2D}(t-t')^2\right) dt' \quad (4)$$
$$= \frac{1}{2\pi i D} \int_{-\infty}^{\infty} \left[ \int_{-\infty}^{\infty} u(t'') \exp\left(-\frac{i}{2D}(t'-t'')^2\right) dt'' \right]$$
$$\exp\left(\frac{iKt'^2}{2}\right) \exp\left(-\frac{i}{2D}(t-t')^2\right) dt'$$

If the chirp rate K of the phase modulator 27 is set to 1/D (K=1/D), the following expression is obtained:

$$v(t) = \frac{1}{2\pi i D} \int_{-\infty}^{\infty} u(t'') \exp\left(-\frac{i}{2D}(t''^2 + t^2)\right) \quad (5)$$
$$\int_{-\infty}^{\infty} \exp\left(-\frac{i}{2D}[t'^2 - 2(t''+t)t']\right) dt' dt''$$
$$= \frac{1}{i\sqrt{2\pi i D}} \int_{-\infty}^{\infty} u(t'') \exp\left(\frac{it}{D}t''\right) dt''$$
$$= \frac{1}{i\sqrt{2\pi i D}} U(t/D)$$

After the signal passes the optical Fourier transform circuit 2, the time-domain waveform v(t) obtained at the output terminal 28 corresponds to the spectral profile U(t/D) of the original OTDM signal at the input terminal 21, as represented by the expression (5). The frequency spectrum V(ω) of the signal at the output terminal 28 is obtained from the expression (5) as follows:

$$V(\omega) = \int_{-\infty}^{\infty} v(t) \exp(i\omega t) dt \quad (6)$$
$$= \frac{1}{i\sqrt{2\pi i D}} \int_{-\infty}^{\infty} \left[ \int_{-\infty}^{\infty} u(t'') \exp\left(\frac{it}{D}t''\right) dt'' \right]$$
$$\exp(i\omega t) dt$$
$$= \frac{1}{i} \sqrt{\frac{2\pi}{iD}} u(-D\omega)$$

The following equation is used here:

$$\frac{1}{2\pi} \int_{-\infty}^{\infty} \exp(i\Omega t) dt = \delta(\Omega)$$

where δ(Ω) is a delta function, which takes on a value of 1 when Ω=0 and a value of 0 otherwise.

Accordingly, the frequency spectrum V(ω) of the signal at the output terminal 28 corresponds to the time-domain waveform u(−Dω) of the original OTDM signal at the input terminal 21. The signal v(t) after an optical Fourier transform is incident on and transmitted through the optical fiber transmission line 3. It must be noted here that the time width of the signal v(t)∝U(t/D) input to the optical fiber transmission line 3 can be controlled by changing the magnitude of the dispersion amount D. If D is doubled, for instance, the time width of v(t) doubles.

Figure 11:
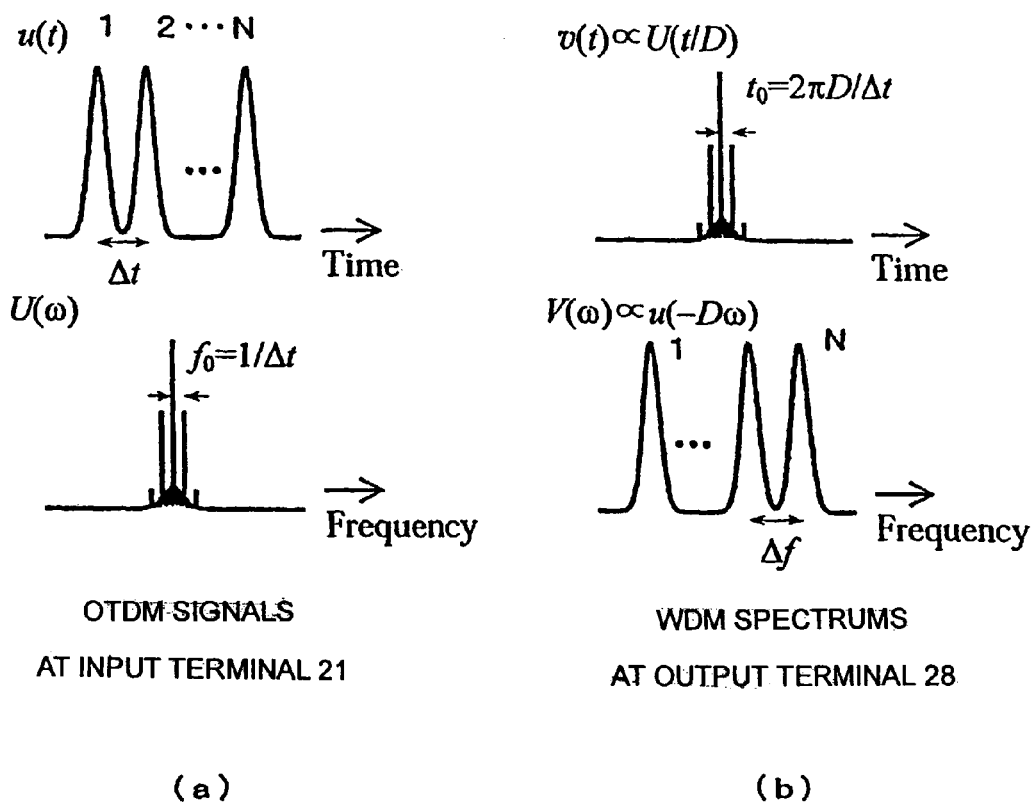
FIG. 11 is a view showing the time-domain waveforms of the input and output signals of the optical Fourier transform circuit and their frequency spectrums.

FIG. 11 shows the time-domain waveforms of the input and output signals of the optical Fourier transform circuit and their frequency spectrums. One of important advantages of the present embodiment and the present invention is that when the driving frequency of the phase modulator 27 is set to 1/N of the repetition frequency of the OTDM signal pulse train (N is an integer) and when the optical Fourier transform circuit 2 carries out a Fourier transform of the time-domain waveforms of N pulses together, N spectrums having different center frequencies are obtained at the output terminal 28. If the original OTDM signal u(t) has a pulse interval of Δt (transmission rate B=1/Δt), the driving frequency $f_m$ of the phase modulator 27 required to carry out an optical Fourier transform of the N pulse trains is obtained as $$f_m = 1/(N\Delta t)$$

The spectrum V(ω) of the signal after the optical Fourier transform becomes a sequence of N spectrums having a frequency interval of Δω=Δt/D, as calculated from V(ω)∝u(−Dω) (expression (6)). The optical Fourier transform converts the sequence of N OTDM signals to the sequence of N WDM spectrums. The time-domain waveform v(t) of the signal at the output terminal 28 is obtained from the spectral profile U(t/D) of the original OTDM signal, as expressed by the equation (5). The frequency spectrum of the train of N pulses (at pulse intervals of Δt) peaks at a frequency of $f_0=1/\Delta t$ and frequencies which are integral multiples thereof. Accordingly, the waveform v(t) peaks at a time position of $t_0=D(2\pi f_0)=2\pi D/\Delta t$ and time positions which are integral multiples thereof. The fact that the optical Fourier transform can be implemented by a phase modulator having a low speed of 1/N of the repetition frequency of the OTDM signal pulse train is one of very useful characteristics for making it easy to implement the present transmission system.

The optical pulse transmitted in the optical fiber transmission line 3 is subjected to complicated linear waveform distortions because of dispersion and polarization-mode dispersion of the optical fiber transmission line. Especially, because very short pulses are used as the optical signal in ultrahigh-speed OTDM transmission, the transmission performance depends on signal waveform distortions resulting from the linear effects such as dispersion and polarization-mode dispersion. The linear effects of the optical fiber only change the phase of the spectrum of the transmission signal in the frequency domain, and the shape of the envelope of the spectrum (spectrum waveform) does not change at all. Accordingly, the time-domain waveform of the OTDM signal is converted to the frequency spectral profile of the output signal by the optical Fourier transform circuit 2 before the signal is incident on the optical fiber transmission line, and the output signal is transmitted in the optical fiber transmission line 3 as a transmission signal. As a result, an accurate time-domain waveform of the original signal can be regenerated from the frequency spectrum at a certain point in the optical fiber transmission line 3 by an optical inverse Fourier transform carried out by the optical inverse Fourier transform circuit 2'. The photodetector included in the OTDM signal receiver 4 detects just the envelope of the pulse, so that any change in phase caused by the linear effects raises no problem.

The operation of the optical inverse Fourier transform circuit 2' will be described next.

The spectrum of the WDM signal transmitted in the optical fiber transmission line 3 is denoted by $Q(\omega)$; and the time-domain waveform of the output of the optical inverse Fourier transform circuit 2' is denoted by $r(t)$, and its frequency spectrum is denoted by $R(\omega)$. The relationship between $Q(\omega)$ and the spectrum $V(\omega)$ of the signal before transmission in the optical fiber transmission line 3 is expressed by the following equation:

$$Q(\omega) = V(\omega) \exp[i\phi(\omega)]$$

where $\phi(\omega)$ is a change in phase of the spectrum of the transmission signal caused by the linear effects of the optical fiber transmission line 3.

Letting the dispersion element D' be –D and the chirp rate K' be –K, the following is obtained from the equation (5):

$$r(t) = \frac{1}{i\sqrt{-2\pi i D}} Q(-t/D) = \frac{1}{i\sqrt{-2\pi i D}} V(-t/D) \exp[i\phi(-t/D)]$$

When the equation (6) is substituted, the following is obtained:

$$r(t) = \frac{1}{i\sqrt{-2\pi i D}} \cdot \frac{1}{i}\sqrt{\frac{2\pi}{iD}} u(-D \cdot (-t/D)) \exp[i\phi(-t/D)]$$

$$= -\frac{1}{D} u(t) \exp[i\phi(-t/D)]$$

Therefore, the time-domain waveform $r(t)$ of the signal becomes $r(t) \propto u(t)$ after the optical inverse Fourier transform, and the time distortions caused by the optical fiber transmission line 3 can be eliminated, except for the phase change $\phi(-t/D)$.

Figure 6:
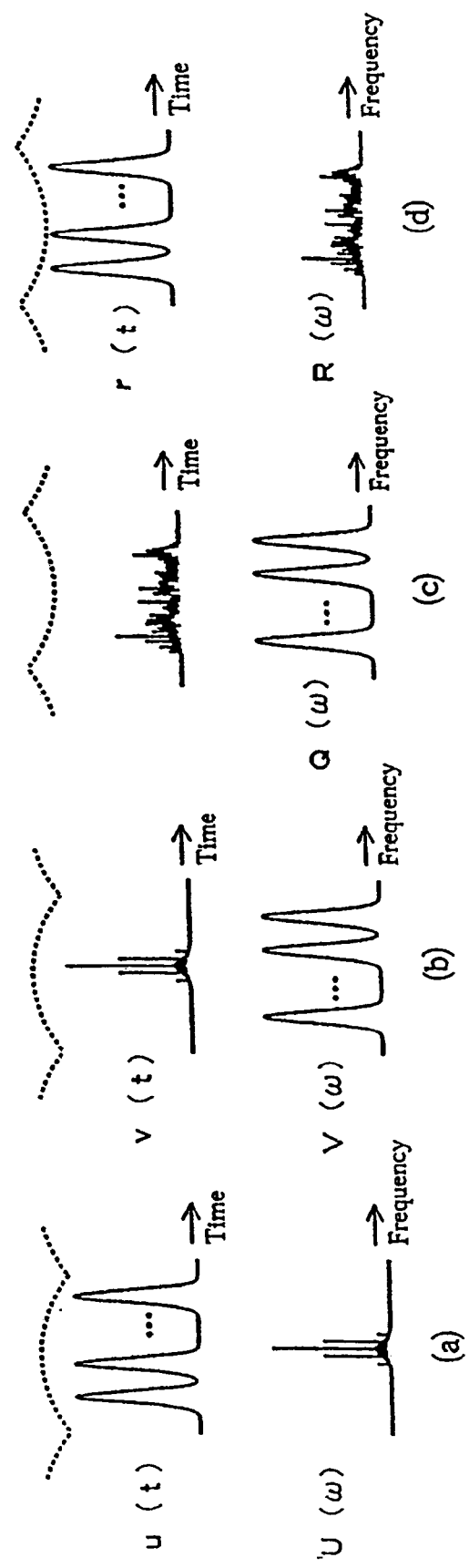
FIG. 6 is a view showing general time-domain waveforms and frequency spectrums of an optical pulse at points A, B, C, and D of an optical transmission line shown in FIG. 1.

FIG. 6 shows the time-domain waveforms and frequency spectrums of the optical pulse. The figure summarizes the principle of the OTDM transmission system described above. Shown at (a), (b), (c), and (d) of FIG. 6 are the time-domain waveforms and frequency spectrums of the signal at points A, B, C, and D in FIG. 1 respectively. The OTDM signal pulse train ((a) in FIG. 6) generated by the OTDM signal transmitter 1 is converted to the WDM signal ((b) in FIG. 6) by the optical Fourier transform circuit 2 and incident on the optical fiber transmission line 3. After the transmission signal subjected to linear distortions by the optical fiber transmission line 3 ((c) in FIG. 6) passes through the optical inverse Fourier transform circuit 2' on the receiver side, the original OTDM signal pulse train (envelope) is completely regenerated ((d) in FIG. 6) because the spectral profile is maintained in the optical fiber transmission line 3, except for a phase change ((b) and (c) in FIG. 6).

In an optical Fourier transform of the train of N pulses, if the broadening or distortion of the time-domain waveform exceeds a time block $N\Delta t$ in the optical fiber transmission line 3, the signals of adjacent time blocks overlap. This makes it impossible to regenerate the original signal by an inverse Fourier transform. This problem can be solved by increasing the block length N or the dispersion amount D used for the optical Fourier transform so that the time width of the signal waveform $v(t)$ after the optical Fourier transform increases and the waveform distortions caused by the linear effects are minimized. If there are N blocks, the total spectral bandwidth after the optical Fourier transform is given by $N\Delta t/2\pi D$. Accordingly, the maximum value of N is determined by the flat-gain bandwidth of the optical amplifiers, which are all the optical amplifiers used in the present system, including the one in the optical fiber transmission line 3.

Figure 7:
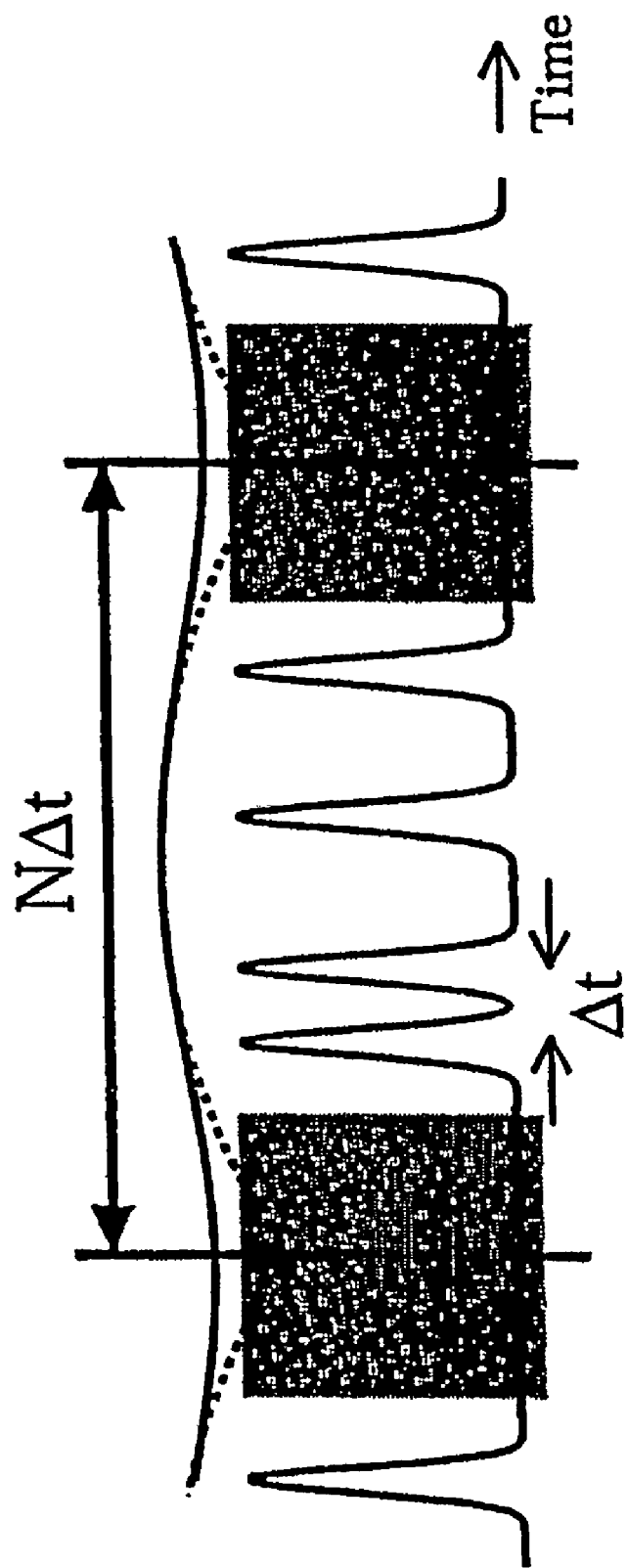
FIG. 7 is a view showing an example of null bits (a guard) provided at both ends of each time block of the OTDM signal sequence in order to carry out an accurate optical Fourier transform.

FIG. 7 shows an example of null bits (a guard) provided at both ends of each time block of the OTDM signal sequence in order to carry out an optical Fourier transform with higher accuracy. In the description given above, it is assumed that the phase modulator used for the optical Fourier transform has parabolic modulation characteristics as expressed by the equation (3). If a phase modulator having normal sinusoidal modulation characteristics is used, an accurate optical Fourier transform may not be carried out on an optical pulse beyond the parabolic region of the phase modulation characteristics. In that case, an accurate optical Fourier transform can be carried out by adding null bits at both ends of each block as a guard, which are shown as black boxes in FIG. 7.

3. OTDM Transmission Apparatus of a Second Embodiment

By exchanging the dispersion element 26 and the phase modulator 27 in the optical Fourier transform circuit 2 shown in FIG. 2, a similar optical Fourier transform circuit can be implemented (see patent document 2).

Figure 3:
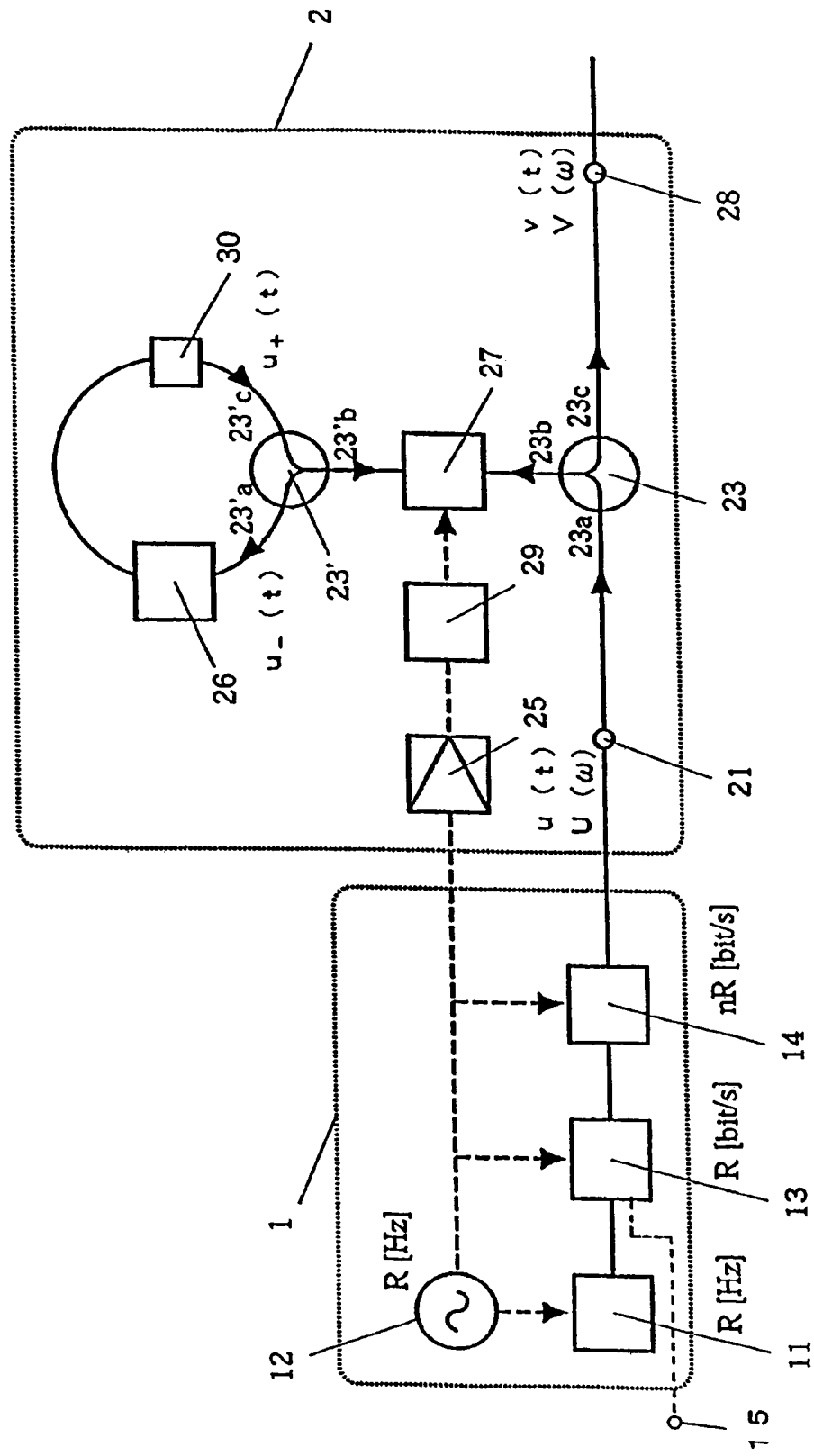
FIG. 3 is a diagram showing another configuration of the OTDM signal transmitter 1 and the optical Fourier transform circuit 2 shown in FIG. 1.

FIG. 3 is a diagram showing the configuration of the OTDM signal transmitter 1 and an optical Fourier transform circuit 20 of a second embodiment. The OTDM signal transmitter 1 is the same as in the first embodiment.

The optical Fourier transform circuit 20 includes an input terminal 21, optical circulators 23 and 23', an electric amplifier 25, a dispersion element 26, a phase modulator 27, an output terminal 28, a multiplier or divider 29, and an optical delay element 30. The phase modulator 27 is driven in accordance with a clock signal supplied from the clock signal source 12 through the electric amplifier 25 and the multiplier or divider 29, and a phase modulation is applied to the pulse train incident on the phase modulator 27 through a port 23b, so that the OTDM signal pulse peaks in synchronization with the timing of the phase modulation characteristics. At the same time, the optical delay element 30 is inserted after the dispersion element 26 to give an appropriate delay so that the peak of the pulse train incident on the phase modulator 27 through a port 23'b is synchronized with the timing of the phase modulation characteristics.

The input optical pulse is sent through the ports 23a and 23b of the optical circulators 23 to the phase modulator 27, and a linear chirp is applied to the optical pulse by the phase modulator 27 driven in accordance with the clock signal regenerated from the optical pulse train. In other words, different frequency shifts are allocated to time positions of the optical pulse. The chirped optical pulse passes through the ports 23'b and 23'a of the optical circulator 23 and the dispersion element 26. Time delays corresponding to the frequency shifts are given to the time-domain waveform of the optical pulse, and different frequency components are separated in the time domain. As in the first embodiment, a Fourier transform image U(ω) of the time-domain waveform u(t) is generated in the time domain by setting the dispersion amount D of the dispersion element 26 to 1/K, where K is the chirp rate of the phase modulator 27.

Figure 12:
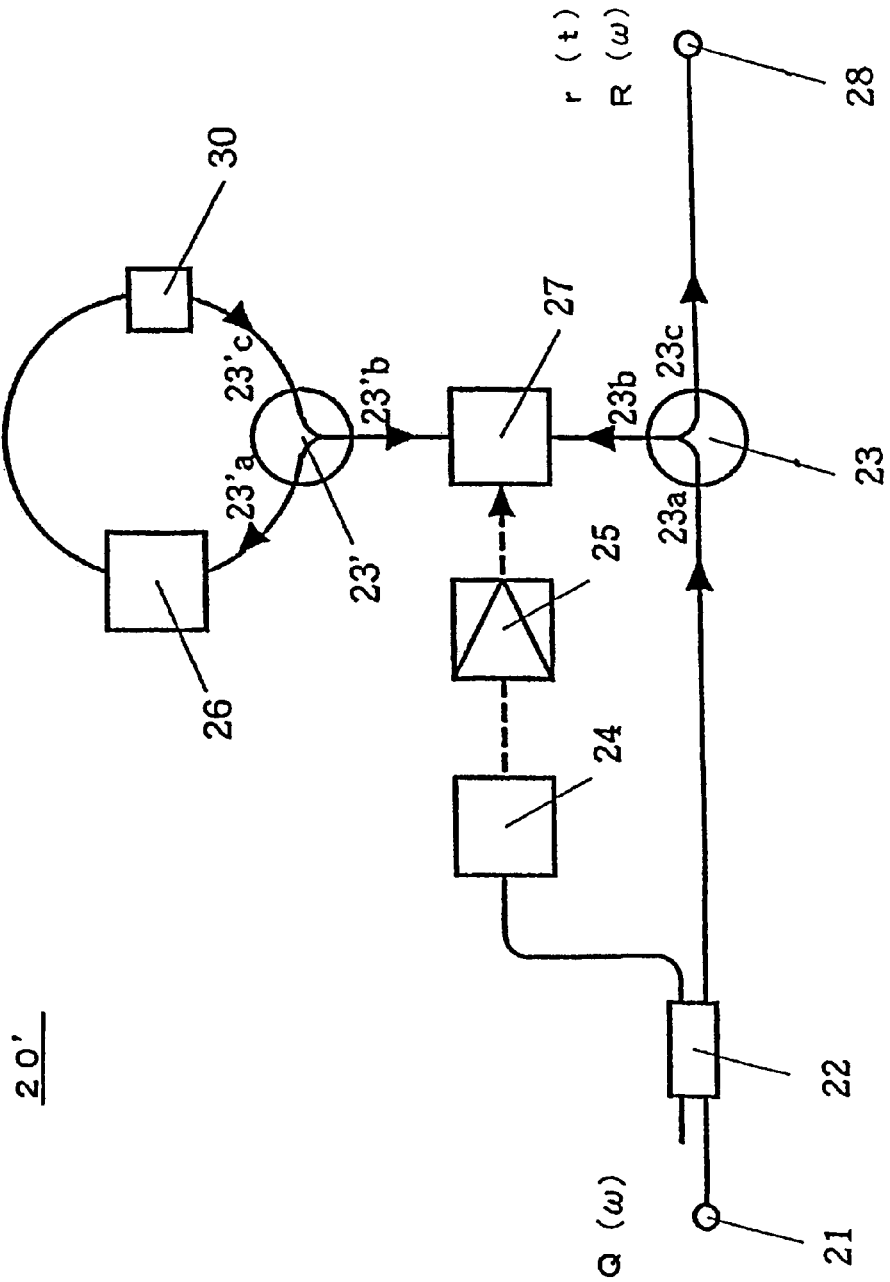
FIG. 12 is a view showing the configuration of an optical inverse Fourier transform circuit of a second embodiment different from that shown in FIG. 1.

FIG. 12 is a diagram showing the configuration of an optical inverse Fourier transform circuit of the second embodiment. The optical inverse Fourier transform circuit 20' differs from the optical Fourier transform circuit F shown in FIG. 1 in that the dispersion element 26 and the phase modulator 27 are exchanged and an optical delay element 30 is inserted after the dispersion element 26 in the loop connecting the ports 23'a and 23'c of the optical circulators 23'. As in FIG. 4, the clock signal regenerated from the optical coupler 22 through the clock regeneration circuit 24 and the electric amplifier 25 is supplied to the driver of the phase modulator 27. The elements having the same reference numerals as in FIG. 4 have the same configurations and functions.

In contrast to the optical Fourier transform used on the transmitter side, an optical inverse Fourier transform can be carried out by choosing a dispersion amount so that the sign of a dispersion element D' of the optical inverse Fourier transform circuit 20' becomes opposite to the sign of the dispersion element D used by the optical Fourier transform circuit 20 (D'=−D). At the same time, the chirp K' of the phase modulator in the optical inverse Fourier transform circuit 20' is chosen so that the sign becomes opposite to the sign of the chirp K of the phase modulator used in the optical Fourier transform circuit 20 (K'=−K).

The general operation of the present OTDM transmission system will be described with reference to FIGS. 1, 3, and 12.

The operation of the optical Fourier transform circuit 20 will be described first.

The relationship between the OTDM signal u(t) generated by the OTDM signal transmitter 1 and the output pulse waveform v(t) is obtained as follows: The time-domain signal u_(t) after phase modulation of the signal u(t) by the phase modulator 27 is expressed by the following:

$$u_-(t) = u(t)\exp(iKt^2/2) \quad (25)$$

The pulse waveform $u_+(t)$ after the pulse passes the dispersion element 26 disposed after the phase modulator 27 is obtained from $u_-(t)$ as follows:

$$u_+(t) = \frac{1}{\sqrt{2\pi i D}} \int_{-\infty}^{\infty} u_-(t')\exp\left(-\frac{i}{2D}(t-t')^2\right)dt' \quad (26)$$

When the equation (25) is substituted, the equation (26) is expressed with the input pulse waveform u(t), as follows:

$$u_+(t) = \frac{1}{\sqrt{2\pi i D}} \int_{-\infty}^{\infty} u(t')\exp\left(\frac{iKt'^2}{2}\right)\exp\left(-\frac{i}{2D}(t-t')^2\right)dt' \quad (27)$$

If the dispersion amount D of the dispersion element 26 is set to 1/K, the equation (27) can be expressed as follows:

$$u_+(t) = \frac{1}{\sqrt{2\pi i D}}\exp\left(-\frac{iKt^2}{2}\right)\int_{-\infty}^{\infty} u(t')\exp\left(\frac{it}{D}t'\right)dt'$$
$$= \frac{1}{\sqrt{2\pi i D}}\exp\left(-\frac{iKt^2}{2}\right)U(t/D) \quad (28)$$

where U(ω)[ω=t/D] is a Fourier transform of u(t) (equation (1)). The residual chirp exp(−iKt²/2) in the equation above can be removed by applying the phase modulation exp(iKt²/2) of the same magnitude by the phase modulator 27. Before the pulse train is incident on the phase modulator 27 again, the optical delay element 30 gives an appropriate delay. The amount of delay is specified so that the pulse peak is synchronized with the timing of the phase modulation characteristics of the phase modulator 27. This compensates for the residual chirp completely, and the optical pulse:

$$v(t) = \frac{1}{\sqrt{2\pi i D}} U(t/D) \quad (29)$$

is output through the ports 23b and 23c of the optical circulator 23 and the optical output terminal 10 to the outside.

The frequency spectrum V(ω) of the signal at the output terminal 28 is obtained from the equation (29) as follows:

$$V(\omega) = \int_{-\infty}^{\infty} v(t)\exp(i\omega t)\,dt$$
$$= \sqrt{\frac{2\pi}{iD}}\, u(-D\omega)$$

The operation of the optical inverse Fourier transform circuit 20' will next be described.

The spectrum of the WDM signal transmitted in the optical fiber transmission line 3 is denoted by Q(ω); and the time-domain waveform of the output of the optical inverse Fourier transform circuit 20' is denoted by r(t), and its frequency spectrum is denoted by R(ω). The relationship between Q(ω) and the spectrum V(ω) of the signal before transmission in the optical fiber transmission line 3 is expressed as follows:

$$Q(\omega) = V(\omega)\exp[i\phi(\omega)]$$

where φ(ω) is a phase change in the spectrum of the transmission signal caused by the linear effects of the optical fiber transmission line 3.

When the dispersion element D' is set to −D and when the chirp rate K' is set to −K, the following is obtained from equation (5):

$$r(t) = \frac{1}{\sqrt{-2\pi iD}} Q(-t/D) = \frac{1}{\sqrt{-2\pi iD}} V(-t/D)\exp[i\phi(-t/D)]$$

By substituting the equation (6), the following equation is obtained:

$$r(t) = \frac{1}{\sqrt{-2\pi iD}} \cdot \sqrt{\frac{2\pi}{iD}} u(-D \cdot (-t/D))\exp[i\phi(-t/D)]$$

$$= \frac{1}{D} u(t)\exp[i\phi(-t/D)]$$

The time-domain waveform w(t) of the signal after the optical inverse Fourier transform becomes w(t)∝u(t), and the time distortions due to the optical fiber transmission line 3 can be completely removed, except for the phase change φ(−t/D).

4. Effectiveness

Figure 8:
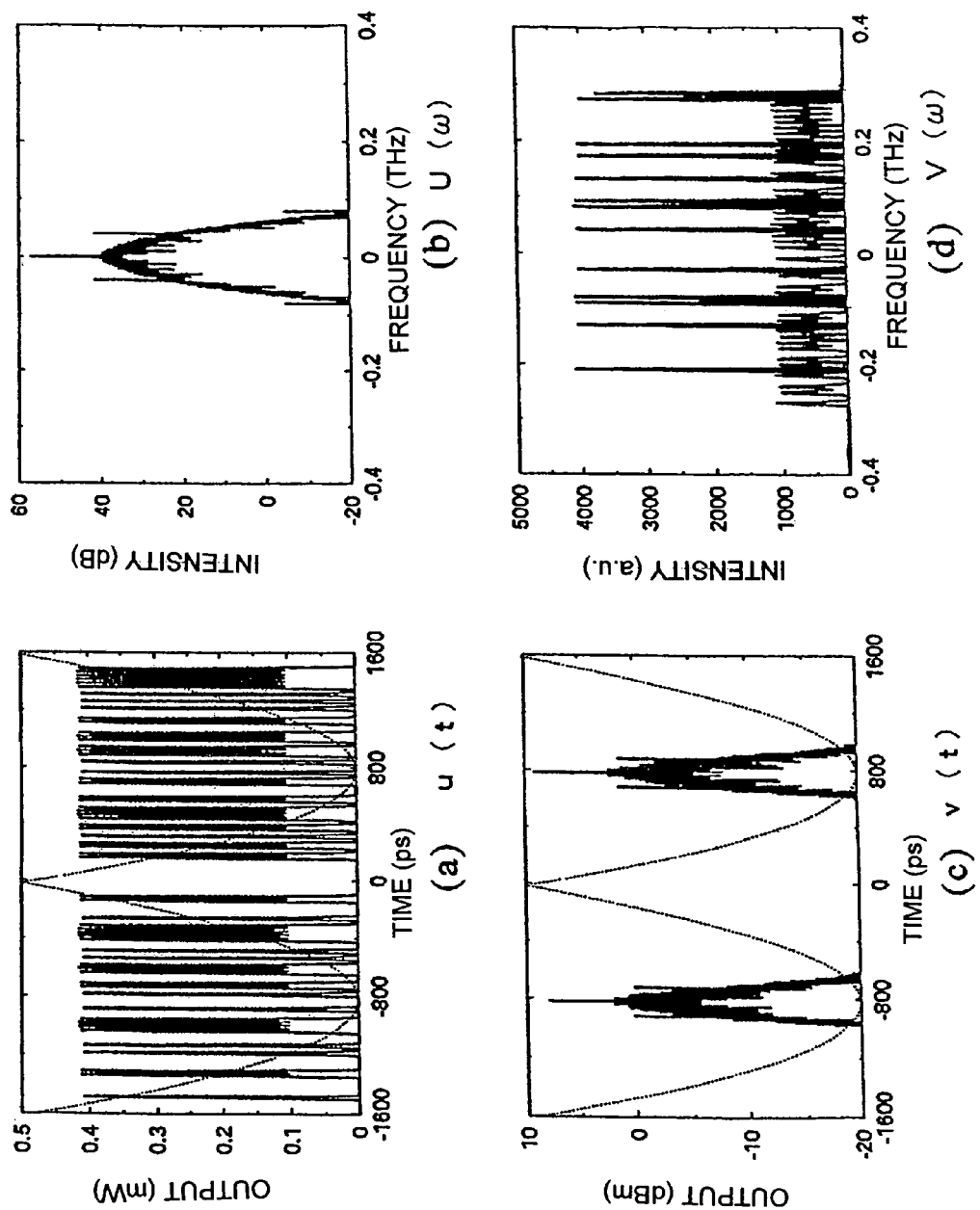
FIG. 8 is a view showing the time-domain waveforms and frequency spectrums of the input and output OTDM signals of the optical Fourier transform circuit 2 shown in FIG. 1.
Figure 9:
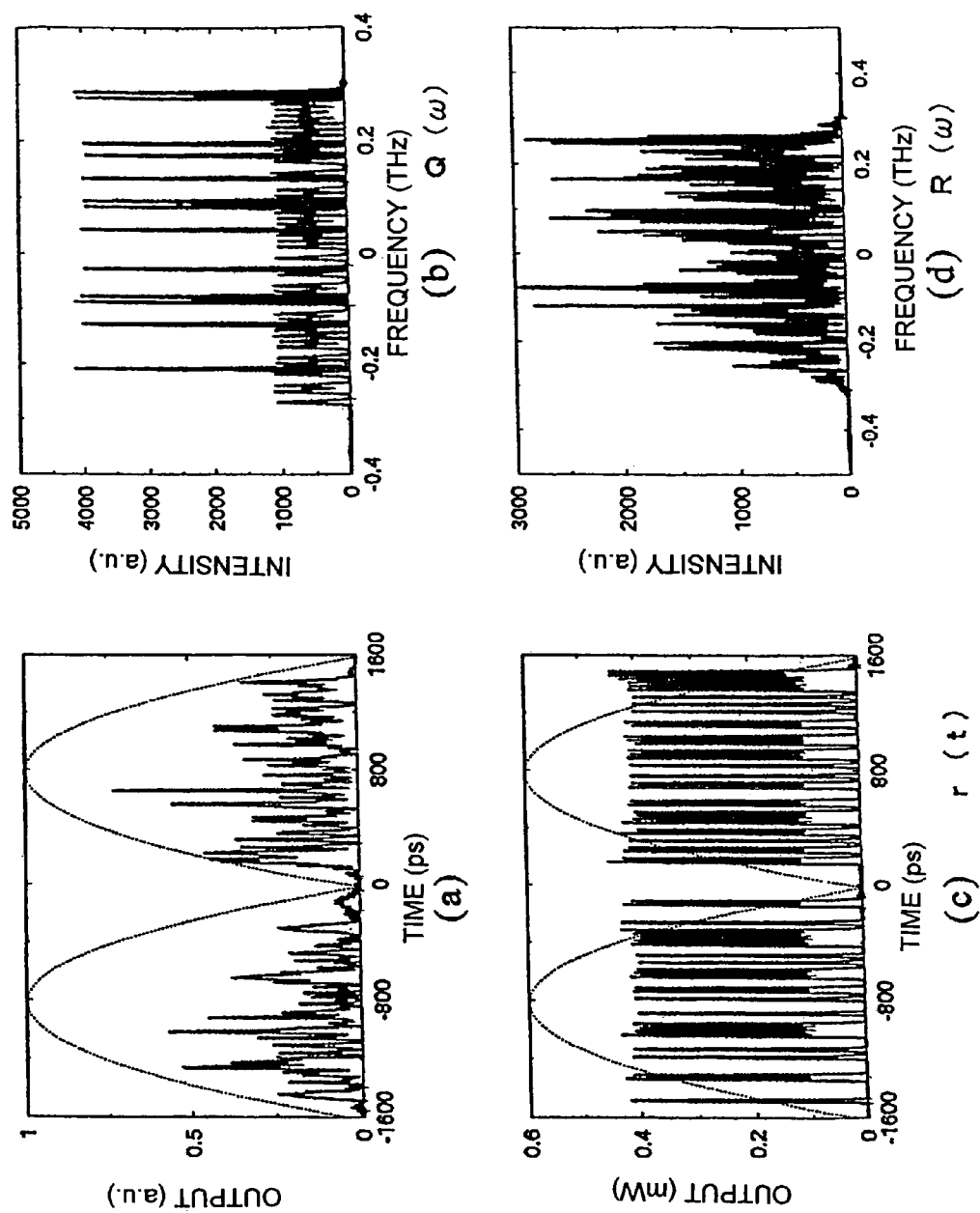
FIG. 9 is a view showing the waveforms of the transmission signal after transmission in the optical fiber transmission line 3 shown in FIG. 1 over 250 km and the signal waveforms after passage through the optical Fourier transform circuit 2'.
Figure 10:
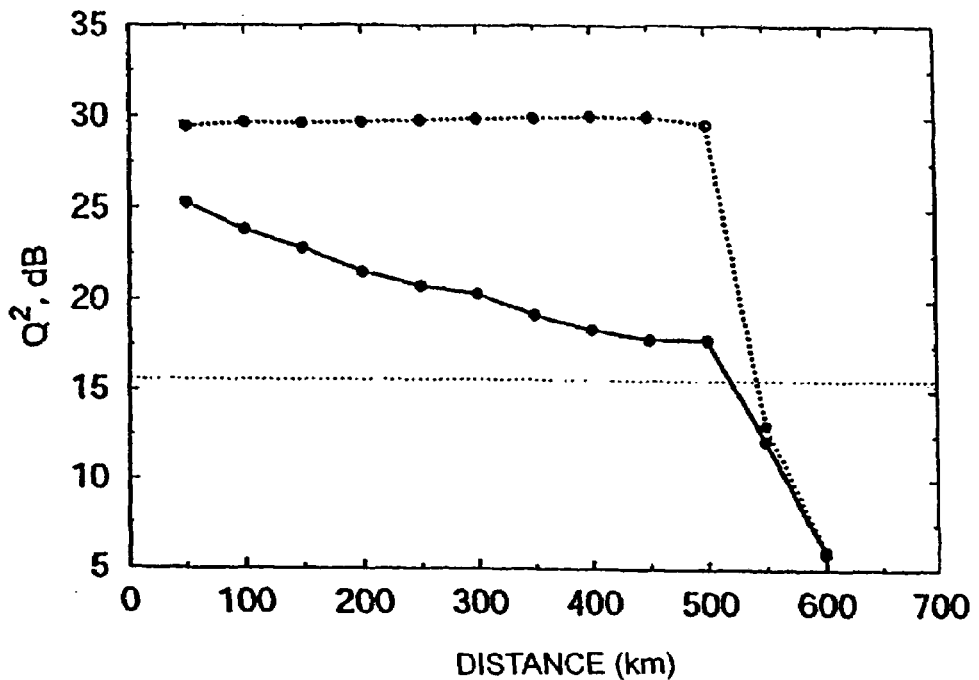
FIG. 10 is a view showing the results of Q-value calculation of the transmission signal transmitted in the optical fiber transmission line 3 shown in FIG. 1 and an eye pattern of the signal waveform after transmission in the optical fiber transmission line over 500 km and passage through the optical inverse Fourier transform circuit 2'.
Figure 10:
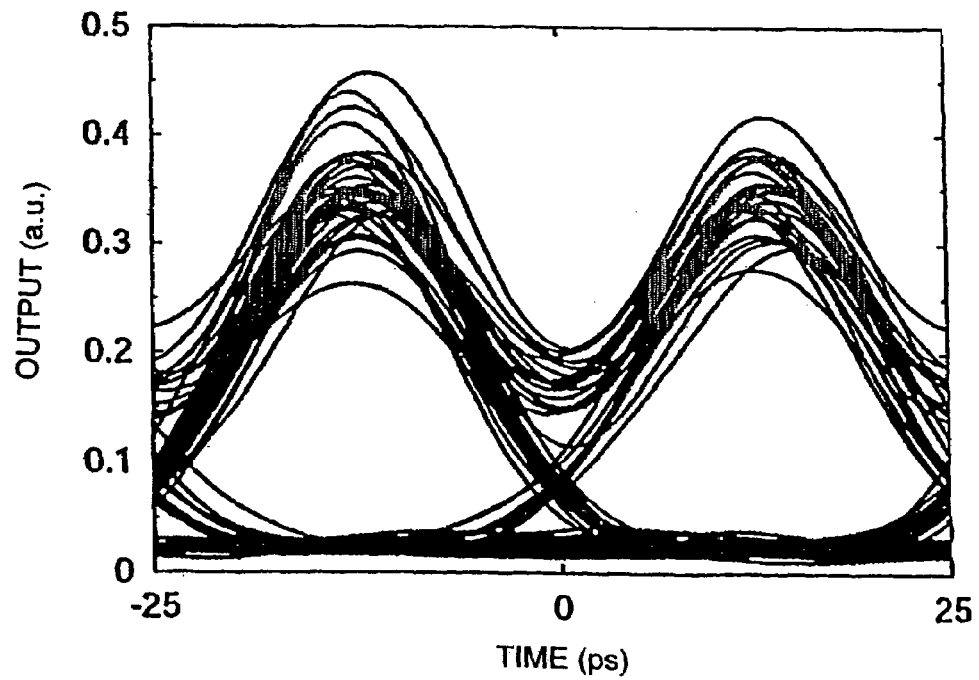

FIGS. 8 to 10 are views showing the results of numerical computations performed to confirm the effectiveness of the OTDM transmission system according to the embodiments of the present invention.

The optical fiber transmission line 3 uses an optical fiber having a second-order dispersion of −1.2 ps/nm/km ($\beta_2$=1.53 ps$^2$/km), a third-order dispersion of 0.07 ps/nm$^2$/km, a non-linear coefficient $n_2$ of 2.3×10$^{-20}$ m$^2$/W, an effective core area $A_{\text{eff}}$ of 50 μm$^2$, and a loss of 0.2 dB/km, for instance. In the transmission line, optical amplifiers are disposed at intervals of 50 km. The input signal before transmission is a 40-Gb/s 128-bit pseudorandom OTDM signal of Gaussian pulse of u(t)=Aexp(−t$^2$/2T$_0^2$) and T$_0$=T$_{FWHM}$/1.665. The signal peak power of each bit is 0.4 mW, and the pulse width T$_{FWHM}$ is 12.5 ps. The phase modulators 17 in the optical Fourier transform circuit 2 and the optical inverse Fourier transform circuit 2' have ideal quadratic modulation characteristics, and the driving frequency is 1/64 of the OTDM clock frequency of 40 GHz (that is, 625 MHz). A group of 64 bits is handled as one block, and those bits are optical-Fourier-transformed together. The dispersion amount D of the dispersion element 17 in the optical Fourier transform circuit 2 is 395 ps$^2$. A 64-bit pulse train having a bit interval Δt of 25 ps is converted to a spectrum sequence having a channel interval Δf of 10 GHz and a bandwidth of 640 GHz (5.1 nm). The waveform distortions can be minimized by specifying a great time block length N for a wide modulation width and increasing the dispersion amount D used for the optical Fourier transform. In this case, the dispersion amount D' of the dispersion element in the optical inverse Fourier transform circuit 2' is equal to −D=−395 ps$^2$. Four null bits are provided as a guard at both ends of each time block.

FIG. 8 shows the time-domain waveforms and frequency spectrums of the input and output OTDM signals of the optical Fourier transform circuit 2. Shown at (a) and (b) of FIG. 8 are the time-domain waveform u(t) and frequency spectrum U(ω) of the OTDM signal generated by the OTDM signal transmitter 1 and input to the optical Fourier transform circuit 2. Shown at (c) and (d) of FIG. 8 are the time-domain waveform v(t) and frequency spectrum V(ω) of the OTDM signal after an optical Fourier transform by the optical Fourier transform circuit 2. Dotted lines shown at (a) and (c) of FIG. 8 represent the phase modulation cycles of the phase modulator 27.

The pulse train in the area of −1600 to 0 ps and the pulse train in the area of 0 to 1600 ps shown at (a) of FIG. 8 correspond to two different 64-bit blocks. The figure shows that the optical Fourier transform circuit 2 converts the OTDM signal of a 64-bit time block to 64 WDM signals, and the spectrum of the original OTDM signal is regenerated in the time domain after the optical Fourier transform. A slight fluctuation in the amplitude of each pulse shown at (a) of FIG. 8 results from the overlapping edges of adjacent pulses because of a high duty ratio of 50%. The two time-domain waveforms shown at (c) in FIG. 8 correspond to the spectral profiles of the time-domain waveforms of the blocks shown at (a) of FIG. 8. Accordingly, the difference between the two waveforms shown at (c) of FIG. 8 reflects the bit pattern dependency of each block at (a) of FIG. 8. The frequency spectrum V(ω) shown at (d) of FIG. 8 contains two amplitudes, which are obtained just by superimposing the time-domain waveforms of the two blocks shown at (a) of FIG. 8. The frequency spectrum is actually observed as a frequency spectrum varying with time.

Shown at (a) and (b) of FIG. 9 are the time-domain waveform and frequency spectrum of the transmission signal after transmission in the optical fiber transmission line 3 of 250 km long. Shown at (c) and (d) of FIG. 9 are the time-domain waveform and frequency spectrum of the transmission signal after an optical inverse Fourier transform.

Transmission of one time-domain waveform having a different spectrum of the converted WDM signal in a fiber generates a group delay in the pulse, causing a separation in the time domain. This emerges as signal wave distortions shown at (a) of FIG. 9. As a result of waveform distortions caused by the dispersion of the optical fiber transmission line 3, the two time-domain waveforms before transmission (shown at (c) of FIG. 8) start interfering with each other after transmission over 250 km, but the spectral profiles before transmission (shown at (d) of FIG. 8) are maintained after transmission over 250 km. Consequently, by converting the transmission signal back to the OTDM signal by means of the optical inverse Fourier transform circuit 2', the input OTDM signal pulse train can be accurately regenerated in the time domain. This is shown at (c) of FIG. 9. The regenerated pulse train shown at (c) of FIG. 9 has a greater amplitude fluctuation than the original input pulse train (shown at (a) of FIG. 8) because the WDM spectral profile varies in accordance with the non-linearity (optical four-wave mixing) of the optical fiber transmission line 3. A comparison between the WDM spectrum before transmission ((d) of FIG. 8) and the WDM spectrum after transmission ((b) of FIG. 9) shows that the spectral profile has changed a little because of the non-linear crosstalk between the WDM channels in the optical fiber transmission line 3, for instance.

FIG. 10 shows the results of Q-value calculation of the transmission signal transmitted in the optical fiber transmission line 3 shown in FIG. 1 and an eye pattern of the signal waveform after transmission in the optical fiber transmission line over 500 km and passage through the optical inverse Fourier transform circuit 2'. Shown at (a) of FIG. 10 are the Q values calculated for the signal waveform after one optical inverse Fourier transform of the transmission signal transmitted in the optical fiber transmission line 3 on the receiver side. The reception distance increases in units of 50 km. The Q value represents the signal-to-noise (S/N) ratio of the eye pattern of the received signal, corresponds to the bit error rate of the transmission system in a one-to-one relationship, and is therefore used as an index of system performance evaluation. Shown at (b) of FIG. 10 is an eye pattern of the time-domain waveform of the signal after the signal is transmitted in the optical fiber transmission line over 500 km and one optical inverse Fourier transform is carried out. A solid line at (a) of FIG. 10 represents the result of calculation with consideration given to spontaneous emission noise from the optical amplifiers inserted in the optical fiber transmission line while a broken line represents the result of calculation without consideration given to the spontaneous emission noise. The noise figure NF of the optical amplifiers in the former is set to 5 dB. The comparison of the results shows that the degradation of the Q value up to a distance of 500 km is caused by the spontaneous emission noise of the optical amplifiers alone and that the linear effects of the transmission line do not become a factor of degradation of the Q value. This indicates clearly that the present system implements transmission substantially without dispersion or distortion. Although the result shown at (a) of FIG. 9 indicates that the waveform distortions affect an adjacent time block after transmission over 250 km, a high Q value is maintained even after transmission over 500 km, as shown in FIG. 10. This is because the interference between different WDM channels does not substantially affect the optical inverse Fourier transform. The quality of transmission sharply decreases after transmission over 550 km because the WDM channels having the largest group velocity at both ends are shifted by a period corresponding to the effective time width of the Fourier transform in the time domain, resulting in a wrong optical inverse Fourier transform in the time slot of the adjacent block.

In the embodiments described above, a 40-Gb/s OTDM signal pulse train can be transmitted over a distance of 500 km without compensating for the linear effects of the transmission fiber using a dispersion compensation fiber. If an optical Fourier transform is not used, the transmission distance is limited to 50 km (the dispersion distance of the transmission fiber, or a distance $z_d = T_0^2/\beta_2$ at which the pulse width becomes the square root, is 37 km). In the embodiments described above, the transmission distance is limited by waveform distortions because of the accumulation of second-order dispersion. Accordingly, the transmission distance can be increased greatly by compensating for the accumulated second-order dispersion of the transmission fiber by means of the dispersion compensation fiber on the receiver side. The transmission distance, however, is limited by the degradation of S/N caused by noise of the amplifier and the distortions of the spectral profile caused by the non-linear effects.

INDUSTRIAL APPLICABILITY

As described above in detail, according to the present invention, if the time-domain waveform of the OTDM signal pulse train is converted to the frequency spectral profile of the WDM signal by an optical Fourier transform, the original OTDM signal can be unfailingly regenerated from the frequency spectrum of the transmission signal by means of an optical inverse Fourier transform, even if the waveform of the transmission signal is distorted by the linear effects of the transmission fiber. The signal degradation due to the linear waveform distortions has been a big obstacle in ultrahigh-speed OTDM transmission, and the obstacle can be completely overcome by the present OTDM transmission system, where the signal can be accurately transmitted, independently of the transmission characteristics of the optical fiber transmission line. In addition, the OTDM transmission system of the present invention makes it possible to increase the speed and distance range of the optical transmission system and to lower the cost at the same time.

The invention claimed is:

1. An OTDM transmission method for implementing distortion-free transmission in the presence of linear time distortion in the optical fiber transmission line, the method comprising the steps of using a transform-limited pulse having an exact spectral width with respect to the time-domain waveform as an optical time-division multiplexed (OTDM) signal pulse train;

converting the OTDM signal pulse train to a spectrum sequence of wavelength division multiplexed (WDM) signal by means of an optical Fourier transform circuit for converting an optical pulse waveform in the time domain to a frequency spectral profile of the pulse wherein the converted optical pulse train is incident on an optical fiber transmission line; and converting the WDM signal spectral sequence after transmission in the optical fiber transmission line to an OTDM signal pulse train by means of an optical inverse Fourier transform circuit for receiving an optical pulse train incident on the optical fiber transmission line and transmitted in the optical fiber transmission line and converting the frequency spectral profile to the optical pulse waveform of the pulse in the time domain, to regenerate the time-domain waveform of the OTDM signal pulse train before transmission;

wherein the optical Fourier transform circuit comprises a phase modulator driven by a repetition frequency of 1/N of the transmission rate of the OTDM signal pulse train (N is an integer) and a dispersion element for giving group-velocity dispersion; and a train of N-channel OTDM signal pulses is converted to a sequence of N-channel WDM signal spectrums.

2. The OTDM transmission method according to claim 1, wherein the repetition frequency R of the optical pulse train before multiplexing is used as a driving frequency for an optical Fourier transform when an OTDM signal pulse train having a repetition frequency nR as a result of multiplexing of n times is used for the repetition frequency R of the optical pulse train before multiplexing to the OTDM signal pulse train.

3. The OTDM transmission method according to claim 1, wherein the tolerance of the optical transmission signal with respect to either or both of dispersion and polarization-mode dispersion is increased by increasing the effective time width of the optical Fourier transform sufficiently in comparison with the time width of the input optical pulse train.

4. The OTDM transmission method according to claim 1, wherein a dispersion element and a phase modulator of the optical inverse Fourier transform circuit on a receiver side use the completely inverted signs of those used in the optical Fourier transform circuit on a transmitter side.

5. The OTDM transmission method according to claim 1, wherein the optical inverse Fourier transform circuit comprises a phase modulator for applying phase modulation to each optical pulse in synchronization with the optical pulse train and a dispersion element for giving group-velocity dispersion; and a clock signal is regenerated on the basis of a beat signal corresponding to a difference in frequency between adjacent wavelength channels of the received WDM signal, and the phase modulator is driven by the repetition frequency of 1/N of the clock-signal frequency.

* * * * *